United States Patent [19]

Foley, Jr.

[11] 3,864,302
[45] Feb. 4, 1975

[54] FLAME RESISTANT POLYAMIDES

[75] Inventor: Patrick Joseph Foley, Jr., Roselle, Ill.

[73] Assignee: E. I. du Pont de Nemours and Co., Wilmington, Del.

[22] Filed: Jan. 23, 1974

[21] Appl. No.: 435,406

Related U.S. Application Data

[63] Continuation-in-part of Ser. No. 341,872, March 16, 1973, abandoned.

[52] U.S. Cl.... 260/37 N, 260/45.75 R, 260/45.7 R, 260/45.8 A, 260/45.85 V
[51] Int. Cl............................................ C08g 51/56
[58] Field of Search... 260/45.75 R, 45.7 R, 45.8 A, 260/45.85 V, 37 N

[56] References Cited

UNITED STATES PATENTS

| | | | |
|---|---|---|---|
| 3,418,267 | 12/1968 | Busse | 260/45.75 |
| 3,560,441 | 2/1971 | Schwarcy et al. | 260/45.75 |
| 3,630,988 | 12/1971 | Deyrup | 260/45.75 |
| 3,660,321 | 5/1972 | Praetzel et al. | 260/45.75 |

*Primary Examiner*—V. P. Hoke

[57] ABSTRACT

Polyamide resins containing 1 to 10 percent by weight of a ferrite which is either zinc or magnesium and about 1 to 20 percent by weight of an organic halide. The composition may also contain up to about 5 percent antimony oxide and up to about 45 percent inorganic filler or reinforcing agent.

11 Claims, No Drawings

FLAME RESISTANT POLYAMIDES

CROSS REFERENCE TO RELATED APPLICATION

This application is a continuation-in-part of application Ser. No. 341,872 filed Mar. 16, 1973 now abandoned This invention relates to flame resistant polyamides and to a process of making them.

It is known in the art to produce polyamide resins which are resistant to flame. U.S. Pat. No. 3,418,267 to Busse discloses the preparation of polyamide resins containing certain metal oxides and organic halides. U.S. Pat. No. 3,630,988 to Deyrup discloses the preparation of polyamide resins which are flame resistant by the addition of lead borate and an organic halide to polyamide resins. British Pat. No. 1,208,865 to ICI discloses the preparation of flame resistant polyamides by the addition of zinc oxide and a halogenated organic additive to the polyamide resin. Halogenated organic additives which are stable at the processing temperature of polyamides had been known in the art for some time and are known to reduce the flammability of certain thermoplastic materials. Such compositions are disclosed in U.S. Pat. No. 3,382,204 to Gouinlock. The search for flame retardant additives in thermoplastics has led the workers in the art to try many different types of metal compounds in thermoplastics. For example, in a paper titled "Antimony-Halogen Synergistic Reactions in Fire Retardants" by James J. Pitts, presented at the Polymer Conference Series, University of Utah, June 1971, many different metal compounds were reported as having been tried in polyurethane to reduce its flammability. Among those tested were magnesium ferrite and zinc ferrite. Pitts reported that the ferrites were completely ineffective as flame retardants in polyurethanes.

it has now been found that polyamide compositions may be rendered flame resistant by the addition of either zinc ferrite or magnesium ferrite in the amount of about 1 to 10 percent by weight, preferably 3 to 7 percent by weight, of the composition and about 1 to 20 percent by weight, preferably 5 to 12 percent by weight of at least one organic halide which is stable at the processing temperature of the polyamides. The polyamide composition may also contain up to about 5 percent antimony oxide and optionally up to about 45 percent of an inorganic filler or an inorganic reinforcing agent such as glass fibers. (Polyamide compositions containing inorganic fillers are well known in the art. See for example British Pat. No. 963,773 and British Pat. No. 1,069,752).

The addition of zinc ferrite or magnesium ferrite to polyamide in the amount specified above renders the compositions tan in color. The compositions containing magnesium ferrite are somewhat darker than the zinc ferrite containing compositions. However, either of the compositions are sufficiently light in color that they may be dyed or pigmented with well-known colorants to obtain compositions of many desired colors. Some uses for the compositions will require that they be colorable, for example, in conductor identification in electrical circuitry.

It has been known for some time that the addition of large amounts of organic halide materials to polyamides generally reduce the desirable physical properties of the polyamide. The addition of various metal oxides has also had a deleterious effect on the physical properties of the polyamides. The metal oxides tend to react during processing of the polyamides and lower the molecular weight of the polyamide especially when the polyamide is kept at high processing temperatures for any length of time.

The use of zinc ferrite and/or magnesium ferrite in polyamides allows the use of amounts of organic halides sufficiently low that the physical properties of the resulting molded articles are not diminished significantly. The use of these ferrites also has the additional advantage in that these compounds are seemingly less reactive with the polyamide at processing temperatures and do not reduce its molecular weight as rapidly as do other conventional metal oxides such as iron oxide, or blends of zinc oxide and iron oxide.

Zinc ferrite, $ZnO \cdot Fe_2O_3$, and magnesium ferrite, $MgO \cdot Fe_2O_3$, are available commercial products. The zinc ferrite is purchasable from Columbian Carbon Company as "Mapico" Tan 10 and magnesium ferrite is available from Columbian Carbon Company as "Mapico" Tan 20. The ferrites used in the present invention are in finely divided form and should be sufficiently finely divided to pass through the 100 mesh screen. The commercially available ferrites referred to above are predominatly of a particle size of 0.4 to 1.2 microns, and 0.10% resides on a 325 mesh screen.

The organic halide which is also present in the flame resistant polyamides of the present invention should be sufficiently inert that it may be melt blended with the polyamide without reaction with the polyamide and without pyrolyzing. However, the organic halide must be reactive at the temperature of flaming of the polyamide. It has been speculated in numerous prior art publications as to what the reaction of the organic halide actually is in the quenching of a flaming polyamide resin. For example, the British Pat. No. 1,208,865 theorizes that the organic halide releases hydrogen halides at the burning temperatures and these hydrogen halides react with the OH radicals which propogate the combustion chain reaction and by removing them tend to extinguish the flame. On the other hand, the Busse patent and the Deyrup patent listed above indicate that the organic halide reacts with the polyamide metal oxide system at the pyrolysis temperature of the polyamide to produce char. In any event, a theoretical explanation as to how and why the organic halides or their pyrolysis products react with polyamides to decrease their flammability is unnecessary to an understanding of the invention, and applicant does not intend to be bound by any theoretical explanation for the mechanism.

Suitable organic halides include cycloaliphatic halides and aryl halides. Chlorides are preferred. The cycloaliphatic halides include $C_{10}Cl_{12}$ and $C_{18}H_{12}Cl_{12}$ ("Dechlorane" and "Dechlorane Plus" respectively), chlorendic acid and chlorendic anhydride. "Dechlorane Plus" is described in U.S. Pat. No. 3,382,204. Its formula is

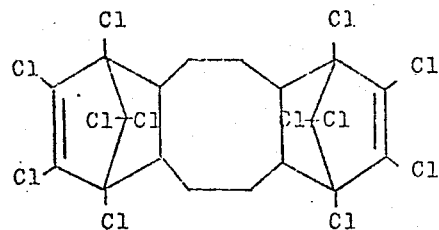

Other suitable commercially available organic halides are chlorinated polyphenyls such as those sold by Monsanto under the name "Aroclor" and the brominated aromatic compounds such as decabromobiphenyl ether sold by Dow Chemical Company as Dow FR300BA. The preferred organic halide is "Dechlorane Plus." More than one organic halide may be used in a particular polyamide composition.

More specifically, the organic halide can be perchloropentacyclodecane ($C_{10}Cl_{12}$) or a polyhalogenated cyclopentadiene of the formula

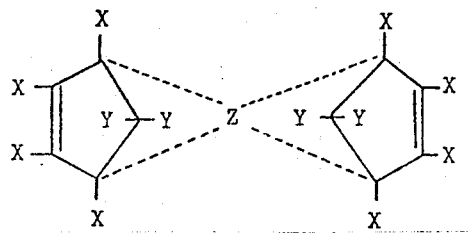

where X is bromine, chlorine or fluorine, Y is bromine, chlorine or fluorine and Z is a tetravalent cyclic or acyclic group which when acyclic is saturated hydrocarbyl containing 4-20 carbon atoms and when cyclic is saturated hydrocarbyl containing 5-18 carbon atoms. When cyclic Z may comprise 1 to 5 fused rings. Preferably X and Y are chlorine or bromine and Z is a single cyclic saturated tetravalent alkyl group. Preferably, this type organic halide has the formula

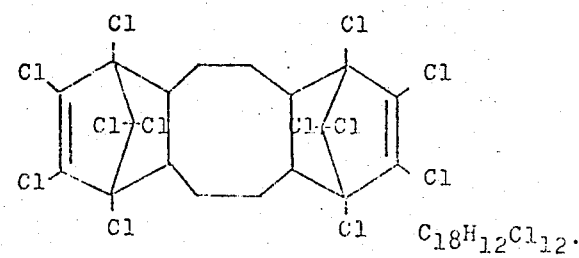

$C_{18}H_{12}Cl_{12}$.

In addition, the organic halide can be a brominated or chlorinated biphenyl or terphenyl or other derivative thereof in which over one-half the substituents are bromine or chlorine. Preferably, the substituents are chlorine.

The polyamides which are useful in the present invention are polymers and copolymers of hexamethylene adipamide, hexamethylene sebacamide, poly(hexamethylene dodecanediamine), polymers of caprolactam and terpolymers containing units derived from polyhexamethylene adipamide, polyhexamethylene sebacamide and caprolactam. The polyamides may, of course, contain conventional stabilizing compounds, various coloring agents and anti-oxidants, pigments and the like.

The polyamide may be compounded with the other ingredients by conventional well-known methods such as dry blending the ingredients and then extruding or milling the blend. The extrusion process is normally preferred and the extruded material is chopped into molding powder. Subsequently, the molding powder may be injection molded in a conventional manner to produce the final desired article. The flame retardant polyamides may also be used in conventional wire coating apparatus to produce flame resistant coatings on electrical conductors.

The procedure for determining the nonflammability of the compositions of this invention is either the ASTM D635 "Flammability of Rigid Plastics over 0.127 cm. in thickness test" or the Underwriters Laboratory bulletin test No. 94 "Classifying Materials SE-0, SE-1 or SE-2." In running the Underwriters Laboratory tests the samples were not oven-aged.

The thermal stability of the polyamides containing ferrites was determined by two different test methods. In one test procedure the product to be tested was in the form of a molding powder. It was dryed in an oven about 80°C. under a vacuum of 20 in. of mercury with a nitrogen bleed. Two grams of the material to be tested are placed in a micro shaker tube in an air atmosphere. The tube is placed in a heating apparatus and connected to a pressure measurement system. The tube is then heated and the pressure rise noted at intervals. Increase in pressure with time and temperature is a measure of the stability of the resin.

The second method for measuring thermal stability of the polyamides of this invention was determined by using a standard melt indexer to measure the flow rates of the polymer. In this test the sample was dried in the same manner as described in the previous paragraph. The melt flow rate was then measured in separate experiments at 5 and 15 minutes hold-up time. The difference in flow rates at the two holdup times is a measure of thermal stability of the polyamide.

In the following examples all parts and percentages are in parts by weight unless otherwise specified and all temperature measurements are in degrees centigrade.

EXAMPLE 1

A polyamide copolymer containing 90 percent polyhexamethylene adipamide units and 10 percent polycaprolactam units was blended with zinc ferrite, antimony oxide and "Dechlorane Plus" 25 ($C_{18}H_{12}Cl_{12}$ having a particle size of 2 to 5 microns). The mixture contains 7 parts zinc ferrite having a particle size sufficiently small to pass through a 100 mesh screen, 2 parts antimony oxide having a particle size sufficiently small that it would pass through a 100 mesh screen, and 8 parts "Dechlorane Plus." The remaining 83 parts were of the polyamide copolymer. The mixture was extruded at 253°C. and cut into molding powder. The molding powder was injection molded into bars 5 inches long and one-half inch wide. Some bars were one-sixteenth inch thick and others were one thirty-second inch thick. The injection molded bars were tested by the Underwriters Laboratory test described above as modified as set forth above. The one-sixteenth inch thickness bars were SE-0. The one thirty-second inch bars were also SE-0. In a similar test using the same polyamide copolymer but without the addition of the zinc ferrite, antimony oxide, or "Dechlorane Plus" 25 the polyamide was SE-2 in the 1/16 inch thickness test.

EXAMPLE 2

The same polyamide as set forth in Example 1 was mixed with the same proportions of antimony oxide and "Dechlorane Plus." However, instead of zinc ferrite, magnesium ferrite was used in the amount of 7 parts. The injection molded bars made from this composition having a thickness of one-sixteenth inch were SE-0 when tested under the modified Underwriters Laboratory test. The polyamide composition made in accordance with this example was a darker tan than the compositions made under Example 1.

For purposes of comparison, Example 2 was repeated using 7 parts of red iron oxide instead of magnesium ferrite. This composition also had a self-extinguishing rating of SE-0 at one-sixteenth inch thickness. However, the color of the composition was quite dark red and would be unsuitable for dying and pigmenting.

For further comparison, Example 2 was repeated except that this time 7 parts zinc oxide were used instead of the 7 parts magnesium ferrite. The composition was tested as above and rated greater than SE-1 in the one-sixteenth inch thickness.

Finally, a mixture of 3.5 parts of red iron oxide and 3.5 parts of zinc oxide were mixed with the composition of Example 2 replacing the 7 parts of magnesium ferrite. The composition was SE-0 but the burn times were significantly longer than the compositions of Examples 1 and 2.

EXAMPLE 3

A composition of polyhexamethylene adipamide (48 parts) glass fibers (33 parts) zinc ferrite (7 parts) chlorinated terphenyl containing 60 percent chlorine ("Aroclor" 5460, 12 parts) was molded into test bars one-sixteenth inch thick and tested by the modified Underwriters Laboratory test described above. This composition had a self-extinguishing rating of SE-1 in 1/16 inch thick bars. The polyhexamethylene adipamide polymer containing 33 percent glass fibers without the addition of zinc ferrite and the chlorinated terphenyl is rated on the same test as "slow burning."

EXAMPLE 4

Test bars were made from a polyhexamethylene adipamide polymer containing 4 parts zinc ferrite, 2.5 parts antimony oxide, 4 parts of a 3:2 perchloro biphenyl:resorcinol oligomer. This composition had a self-extinguishing rating of SE-0 in one-sixteenth in. sections as measured by the Underwriters Laboratory test as modified.

EXAMPLE 5

A polyhexamethylene adipamide polymer containing 81 parts of polyamide, 7 parts zinc ferrite, 12 parts decabromobiphenyl ether when molded into test bars one-sixteenth inch thickness had a self-extinguishing rating of SE-0 as measured by the modified Underwriters Laboratory test.

EXAMPLE 6

A composition containing 81 parts of polyhexamethylene adipamide, 7 parts zinc ferrite, 12 parts of a 1 to 1 mixture of "Dechlorane Plus" 25 and decabromobiphenyl ether was molded into test bars. The test bars had a self-extinguishing rating of SE-0 in 1/16 in. sections.

EXAMPLE 7

Fifty parts of a 90 percent polyhexamethylene adipamide, 10 percent polycaprolactam copolymer was mixed with 33 parts glass fibers, 8 parts "Dechlorane Plus" 25, 2 parts antimony oxide and 7 parts zinc ferrite. The composition was injection molded into 1/16 inch thick test bars and tested under the modified Underwriters Laboratory test. The test bars had a self-extinguishing rating of SE-0.

EXAMPLE 8

Eighty-six parts of a commercially available polyhexamethylene adipamide-polycaprolactam copolymer containing 10 parts polycaprolactam and 90 parts polyhexamethylene adipamide were mixed with 9 parts of "Dechlorane Plus" 25 and 5 parts zinc ferrite. The mixture was extruded through a 28 ml. Werner Pfleiderer twin screw extruder fitted with a vacuum port. The extrudate was water quenched and cut into molding powder. The thermal stability of the polymer was determined by placing it in the micro shaker tube apparatus described above. The pressure build up of the vapor of degradation products of the composition at 290°C. averaged about 64 lbs./square inch gauge in one hour in 3 runs.

EXAMPLE 9

83.5 parts of the same polyamide described in Example 8 was mixed with 10.5 parts of "Dechlorane Plus" 25 and 6 parts of zinc ferrite. The molding powder produced from this composition was treated in the same manner as that of Example 8. The pressure build up in pounds/square inch was approximately an average of 80 for 4 runs.

For purposes of comparison, the same amount of the same polyamide was mixed with the same amount of the organic halogen compound and 2 parts of zinc oxide and 4 parts of iron oxide. The pressure build up in the thermal stability test method averaged about 118 for 5 runs. Thus indicating that zinc ferrite is less deteriorative to the molecular weight of the polyamide than is a mixture of zinc oxide and iron oxide.

EXAMPLE 10

Eighty-six parts of the polyhexamethylene adipamidepolycaprolactam copolymer previously described was mixed with 9 parts "Dechlorane Plus" 25 and 5 parts of zinc ferrite. After extruding the mixture into molding granules, the resulting product was subjected to the melt index stability test at 265°C. After being held in the melt indexer for 5 minutes at 265°C., the melt flow rate of the polymer was 29.9 grams for 10 minutes. The melt index stability test was run on another sample of the same polymer containing the same additives and held at 265°C. for 15 minutes. The melt flow rate of the polymer was 63.2 grams for 10 minutes.

For purposes of comparison, 86 parts of the same polyamide as described in the previous paragraph was mixed with 9 parts of "Dechlorane Plus" 25 and 5 parts of iron oxide ($Fe_2O_3$). The melt index stability test was run on this composition. After being preheated for 5 minutes the melt flow rate of this composition was 22.5. The polymer was then tested by preheating it for 15 minutes at 265°C. in the melt index apparatus. The thus treated polymer had a melt flow rate of 218.7 grams for 10 minutes.

The above results demonstrate that zinc ferrite is less deteriorative to the properties of polyamide than are similar concentrations of iron oxide.

I claim:

1. A polyamide composition containing a synthetic polyamide having recurring carbonamide linkages as an integral part of the chain and about 1 to 10 percent by weight of at least one ferrite selected from the class consisting of zinc ferrite and magnesium ferrite and about 1 to 20 percent by weight of at least one organic halide flame retardant which is thermally stable at the fabrication temperature of the polyamide but which is reactive at the temperature of flaming of the polyamide.

2. The composition of claim 1 containing between about 3 and about 7 percent by weight ferrite and between about 5 and about 12 percent by weight organic halide.

3. The composition of claim 2 which also contains up to about 5 percent by weight antimony oxide.

4. The composition of claim 1 containing up to about 45 percent by weight filler.

5. The composition of claim 1 containing up to about 45 percent by weight of a reinforcing agent.

6. The composition of claim 1 in which the organic halide is an aryl halide.

7. The composition of claim 1 in which the ferrite is zinc ferrite.

8. The composition of claim 1 wherein the organic halide is perchloropentacyclodecane; a polyhalogenated cyclopentadiene of the formula

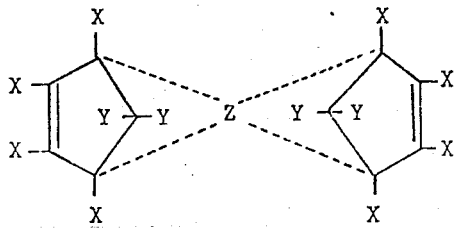

where X is bromine, chlorine or fluorine; Y is bromine, chlorine or fluorine, and Z is a tetravalent saturated hydrocarbyl group that is cyclic or alicyclic, and when alicyclic contains 4–20 carbon atoms and when cyclic contains 1 to 5 fused rings and 5–18 carbon atoms;

brominated or chlorinated biphenyl or terphenyl or ether derivatives thereof, in which over one-half the substituents thereon are bromine or chlorine;

chlorendic acid; or chlorendic anhydride.

9. The composition of claim 8 wherein the organic halide is a polyhalogenated cyclopentadiene of the formula

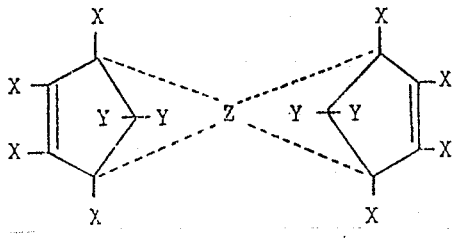

and 5–18 carbon atoms.

10. The composition of claim 9 wherein the organic halide has the formula

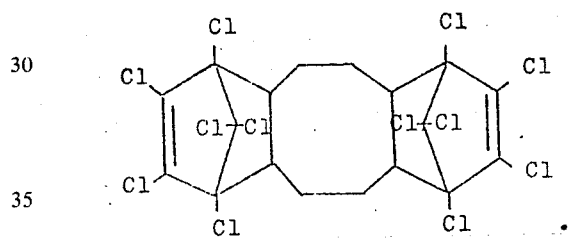

11. The composition of claim 8 wherein the organic halide is decabromobiphenyl ether.

* * * * *